US008570956B2

(12) United States Patent
Park et al.

(10) Patent No.: US 8,570,956 B2
(45) Date of Patent: Oct. 29, 2013

(54) METHOD OF COMMUNICATING DATA IN A WIRELESS MOBILE COMMUNICATIONS SYSTEM USING MESSAGE SEPARATION AND MOBILE TERMINAL FOR USE WITH THE SAME

(75) Inventors: Sung-Jun Park, Gyeonggi-Do (KR); Young-Dae Lee, Gyeonggi-Do (KR); Sung-Duck Chun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 722 days.

(21) Appl. No.: 12/305,916

(22) PCT Filed: Jun. 21, 2007

(86) PCT No.: PCT/KR2007/003024
§ 371 (c)(1),
(2), (4) Date: Apr. 16, 2010

(87) PCT Pub. No.: WO2007/148935
PCT Pub. Date: Dec. 27, 2007

(65) Prior Publication Data
US 2010/0195579 A1    Aug. 5, 2010

Related U.S. Application Data

(60) Provisional application No. 60/815,722, filed on Jun. 21, 2006.

(30) Foreign Application Priority Data

Jun. 21, 2007    (KR) .................. 10-2007-0060991

(51) Int. Cl.
*H04W 4/00* (2009.01)
(52) U.S. Cl.
USPC ........... 370/329; 370/341; 370/431; 370/437; 370/252; 455/450; 455/451; 455/464; 455/509

(58) Field of Classification Search
USPC .......... 370/329, 341, 431, 437; 455/450, 452, 455/464, 509
See application file for complete search history.

(56) References Cited

U.S. PATENT DOCUMENTS 5,754,754 A    5/1998   Dudley et al.
6,138,158 A    10/2000  Boyle et al.
(Continued)

FOREIGN PATENT DOCUMENTS

CN    1267146    9/2000
CN    1411668    4/2003
(Continued)

OTHER PUBLICATIONS

LG Electronics Inc., "UE state transition in LTE_ACTIVE," 3GPP TSG-RAN WG2 #52, R2-061002, Mar. 2006, 3 pages.
(Continued)

*Primary Examiner* — Brandon Renner
*Assistant Examiner* — Abdelnabi Musa
(74) *Attorney, Agent, or Firm* — Lee, Hong, Degerman, Kang & Waimey

(57) ABSTRACT

A method for effectively transmitting and receiving access information between a terminal and a base station using a message separation for a RRC CONNECTION REQUEST message that may include: transmitting a random access preamble; receiving a random access response in response to the random access preamble, wherein the random access response includes information related to at least one allocated radio resource which will be used for transmitting the RRC CONNECTION REQUEST message; determining at least one required radio resource for transmitting the RRC CONNECTION REQUEST message; generating the RRC CONNECTION REQUEST message by considering a characteristic of at least one among the at least one allocated radio resource and the determined at least one required radio resource, and transmitting the generated RRC CONNECTION REQUEST message.

10 Claims, 4 Drawing Sheets

(56) References Cited

U.S. PATENT DOCUMENTS

| | | |
|---|---|---|
| 6,317,430 B1 | 11/2001 | Knisely et al. |
| 6,381,229 B1 | 4/2002 | Narvinger et al. |
| 6,421,540 B1 | 7/2002 | Gilhousen et al. |
| 6,480,525 B1 | 11/2002 | Parsa et al. |
| 6,571,102 B1 | 5/2003 | Hogberg et al. |
| 6,597,668 B1 | 7/2003 | Schafer et al. |
| 6,694,148 B1 | 2/2004 | Frodigh et al. |
| 6,717,925 B1 | 4/2004 | Leppisaari et al. |
| 6,728,225 B1 | 4/2004 | Ozluturk |
| 6,785,510 B2 | 8/2004 | Larsen |
| 6,791,963 B1 | 9/2004 | Hwang et al. |
| 6,795,412 B1 | 9/2004 | Lee |
| 6,850,504 B1 | 2/2005 | Cao et al. |
| 6,859,445 B1 | 2/2005 | Moon et al. |
| 6,882,727 B1 | 4/2005 | Vialen et al. |
| 6,907,005 B1 | 6/2005 | Dahlman et al. |
| 6,947,394 B1 | 9/2005 | Johansson et al. |
| 6,950,420 B2 | 9/2005 | Sarkkinen et al. |
| 7,016,343 B1 | 3/2006 | Mermel et al. |
| 7,031,708 B2 | 4/2006 | Sarkkinen et al. |
| 7,054,289 B1 | 5/2006 | Foster, Jr. et al. |
| 7,075,971 B2 | 7/2006 | Parsa et al. |
| 7,099,309 B2 | 8/2006 | Davidson |
| 7,145,895 B2 | 12/2006 | Mueckenheim et al. |
| 7,151,758 B2 | 12/2006 | Kumaki et al. |
| RE39,454 E | 1/2007 | Cantoni et al. |
| 7,184,792 B2 | 2/2007 | Mir |
| 7,236,787 B1 | 6/2007 | Tamura et al. |
| 7,239,870 B2 | 7/2007 | Zhang et al. |
| 7,359,345 B2 | 4/2008 | Chang et al. |
| 7,359,349 B2 | 4/2008 | Kayama et al. |
| 7,376,424 B2 | 5/2008 | Kim et al. |
| 7,385,952 B2 | 6/2008 | Mantha et al. |
| 7,398,108 B2 | 7/2008 | Hondo |
| 7,436,801 B1 | 10/2008 | Kanterakis |
| 7,443,816 B2 | 10/2008 | Chen et al. |
| 7,496,113 B2 | 2/2009 | Cai et al. |
| 7,535,886 B2 | 5/2009 | Lee et al. |
| 7,590,089 B2 | 9/2009 | Park et al. |
| 7,664,059 B2 | 2/2010 | Jiang |
| 7,673,211 B2 | 3/2010 | Meyer et al. |
| 7,729,719 B2 | 6/2010 | Bergstrom et al. |
| 7,826,855 B2 | 11/2010 | Chun et al. |
| 7,826,859 B2 | 11/2010 | Lee et al. |
| 7,839,829 B2 | 11/2010 | Lee et al. |
| 7,848,308 B2 | 12/2010 | Lee et al. |
| 7,881,724 B2 | 2/2011 | Park et al. |
| 8,031,668 B2 | 10/2011 | Wang et al. |
| 8,036,110 B2 | 10/2011 | Ishii et al. |
| 8,068,511 B2 | 11/2011 | Reznik et al. |
| 8,090,382 B2 | 1/2012 | Park et al. |
| 2001/0024956 A1 | 9/2001 | You et al. |
| 2001/0030953 A1 | 10/2001 | Chang |
| 2001/0046864 A1 | 11/2001 | Bhatoolaul et al. |
| 2002/0009129 A1 | 1/2002 | Choi et al. |
| 2002/0021714 A1 | 2/2002 | Seguin |
| 2002/0028690 A1 | 3/2002 | McKenna et al. |
| 2002/0032884 A1 | 3/2002 | Kobata et al. |
| 2002/0041578 A1 | 4/2002 | Kim et al. |
| 2002/0044527 A1 | 4/2002 | Jiang et al. |
| 2002/0071480 A1 | 6/2002 | Marjelund et al. |
| 2002/0116515 A1 | 8/2002 | Hashimoto |
| 2002/0126629 A1 | 9/2002 | Jiang et al. |
| 2002/0131375 A1 | 9/2002 | Vogel et al. |
| 2002/0160744 A1 | 10/2002 | Choi et al. |
| 2002/0181436 A1 | 12/2002 | Mueckenheim et al. |
| 2003/0003920 A1 | 1/2003 | Sebastian |
| 2003/0007510 A1 | 1/2003 | Yeo et al. |
| 2003/0016672 A1 | 1/2003 | Rosen et al. |
| 2003/0043741 A1 | 3/2003 | Mukai et al. |
| 2003/0050097 A1 | 3/2003 | Amirijoo et al. |
| 2003/0054829 A1 | 3/2003 | Moisio |
| 2003/0076812 A1 | 4/2003 | Benedittis |
| 2003/0078046 A1 | 4/2003 | Seo |
| 2003/0084185 A1 | 5/2003 | Pinkerton |
| 2003/0087655 A1 | 5/2003 | Matsuoka |
| 2003/0103476 A1 | 6/2003 | Choi et al. |
| 2003/0131124 A1 | 7/2003 | Yi et al. |
| 2003/0137931 A1 | 7/2003 | Hans et al. |
| 2003/0139170 A1 | 7/2003 | Heo |
| 2003/0147371 A1 | 8/2003 | Choi et al. |
| 2003/0210669 A1 | 11/2003 | Vayanos et al. |
| 2003/0223393 A1 | 12/2003 | Lee |
| 2003/0223452 A1 | 12/2003 | Toskala et al. |
| 2003/0236085 A1 | 12/2003 | Ho |
| 2004/0002334 A1 | 1/2004 | Lee et al. |
| 2004/0004954 A1 | 1/2004 | Terry et al. |
| 2004/0006643 A1 | 1/2004 | Dolson et al. |
| 2004/0008658 A1 | 1/2004 | Dahlman et al. |
| 2004/0008659 A1 | 1/2004 | Kim |
| 2004/0014452 A1 | 1/2004 | Lim et al. |
| 2004/0028078 A1 | 2/2004 | Beckmann et al. |
| 2004/0057387 A1 | 3/2004 | Yi et al. |
| 2004/0077357 A1* | 4/2004 | Nakada ................ 455/452.1 |
| 2004/0097192 A1 | 5/2004 | Schiff |
| 2004/0103435 A1 | 5/2004 | Yi et al. |
| 2004/0109433 A1 | 6/2004 | Khan |
| 2004/0114593 A1 | 6/2004 | Dick et al. |
| 2004/0114606 A1 | 6/2004 | Haddad |
| 2004/0116143 A1 | 6/2004 | Love et al. |
| 2004/0125772 A9 | 7/2004 | Wu et al. |
| 2004/0127223 A1 | 7/2004 | Li et al. |
| 2004/0143676 A1 | 7/2004 | Baudry et al. |
| 2004/0146019 A1 | 7/2004 | Kim et al. |
| 2004/0147266 A1 | 7/2004 | Hwang et al. |
| 2004/0147271 A1 | 7/2004 | Billon et al. |
| 2004/0157602 A1 | 8/2004 | Khawand |
| 2004/0160919 A1 | 8/2004 | Balachandran et al. |
| 2004/0171395 A1 | 9/2004 | Shin |
| 2004/0180675 A1 | 9/2004 | Choi et al. |
| 2004/0184437 A1 | 9/2004 | Lee et al. |
| 2004/0185860 A1 | 9/2004 | Marjelund et al. |
| 2004/0196861 A1 | 10/2004 | Rinchiuso et al. |
| 2004/0198369 A1 | 10/2004 | Kwak et al. |
| 2004/0202140 A1 | 10/2004 | Kim et al. |
| 2004/0208160 A1 | 10/2004 | Petrovic et al. |
| 2004/0219920 A1 | 11/2004 | Love et al. |
| 2004/0223507 A1 | 11/2004 | Kuchibhotla et al. |
| 2004/0229626 A1 | 11/2004 | Yi et al. |
| 2004/0248600 A1 | 12/2004 | Kim |
| 2004/0264497 A1 | 12/2004 | Wang et al. |
| 2004/0264550 A1 | 12/2004 | Dabak |
| 2004/0266494 A1 | 12/2004 | Ruuska et al. |
| 2005/0008035 A1 | 1/2005 | Eklund et al. |
| 2005/0013272 A1 | 1/2005 | Hwang et al. |
| 2005/0020260 A1* | 1/2005 | Jeong et al. ................ 455/434 |
| 2005/0025039 A1 | 2/2005 | Hwang et al. |
| 2005/0039101 A1 | 2/2005 | Torsner |
| 2005/0054368 A1 | 3/2005 | Amerga |
| 2005/0059407 A1 | 3/2005 | Reed et al. |
| 2005/0059421 A1 | 3/2005 | Reed et al. |
| 2005/0063336 A1 | 3/2005 | Kim et al. |
| 2005/0068963 A1 | 3/2005 | Lee et al. |
| 2005/0073987 A1 | 4/2005 | Wu |
| 2005/0105482 A1 | 5/2005 | Kobayashi et al. |
| 2005/0107036 A1 | 5/2005 | Song et al. |
| 2005/0111393 A1 | 5/2005 | Jeong et al. |
| 2005/0113099 A1 | 5/2005 | Eriksson et al. |
| 2005/0114489 A1 | 5/2005 | Yonge et al. |
| 2005/0118947 A1 | 6/2005 | Ames et al. |
| 2005/0129058 A1 | 6/2005 | Casaccia et al. |
| 2005/0135416 A1 | 6/2005 | Ketchum et al. |
| 2005/0138528 A1 | 6/2005 | Ameigeiras et al. |
| 2005/0157678 A1 | 7/2005 | Mantha et al. |
| 2005/0157696 A1 | 7/2005 | Yamamoto et al. |
| 2005/0169232 A1 | 8/2005 | Sakoda et al. |
| 2005/0185608 A1 | 8/2005 | Lee et al. |
| 2005/0186973 A1 | 8/2005 | Gaal et al. |
| 2005/0190728 A1 | 9/2005 | Han et al. |
| 2005/0195732 A1 | 9/2005 | Huh et al. |
| 2005/0197134 A1 | 9/2005 | McKenna et al. |
| 2005/0207374 A1 | 9/2005 | Petrovic et al. |
| 2005/0213605 A1 | 9/2005 | Kim et al. |
| 2005/0220049 A1 | 10/2005 | Zhang et al. |

(56) References Cited

U.S. PATENT DOCUMENTS

| | | |
|---|---|---|
| 2005/0243767 A1 | 11/2005 | Zhang et al. |
| 2005/0249141 A1 | 11/2005 | Lee et al. |
| 2005/0249222 A1 | 11/2005 | van Kampen et al. |
| 2005/0250500 A1 | 11/2005 | Xu |
| 2005/0259662 A1 | 11/2005 | Kim et al. |
| 2005/0260997 A1 | 11/2005 | Korale et al. |
| 2005/0265301 A1 | 12/2005 | Heo et al. |
| 2005/0271025 A1 | 12/2005 | Guethaus et al. |
| 2005/0277429 A1 | 12/2005 | Laroia et al. |
| 2005/0281212 A1 | 12/2005 | Jeong et al. |
| 2005/0281219 A1 | 12/2005 | Kim et al. |
| 2005/0288026 A1 | 12/2005 | Byun et al. |
| 2006/0007886 A1 | 1/2006 | Lee et al. |
| 2006/0018289 A1 | 1/2006 | Schulist et al. |
| 2006/0025079 A1 | 2/2006 | Sutskover et al. |
| 2006/0030342 A1 | 2/2006 | Hwang et al. |
| 2006/0045047 A1 | 3/2006 | Choi et al. |
| 2006/0056347 A1 | 3/2006 | Kwak et al. |
| 2006/0059186 A1 | 3/2006 | Backlund |
| 2006/0062196 A1 | 3/2006 | Cai et al. |
| 2006/0072494 A1 | 4/2006 | Matusz |
| 2006/0083183 A1 | 4/2006 | Teague et al. |
| 2006/0088009 A1 | 4/2006 | Gibbs et al. |
| 2006/0120403 A1 | 6/2006 | Murata et al. |
| 2006/0143300 A1 | 6/2006 | See et al. |
| 2006/0146745 A1 | 7/2006 | Cai et al. |
| 2006/0153232 A1 | 7/2006 | Shvodian |
| 2006/0154680 A1 | 7/2006 | Kroth et al. |
| 2006/0168343 A1 | 7/2006 | Ma et al. |
| 2006/0193282 A1 | 8/2006 | Ikawa et al. |
| 2006/0256818 A1 | 11/2006 | Shvodian et al. |
| 2006/0258383 A1 | 11/2006 | Jiang et al. |
| 2006/0282739 A1 | 12/2006 | Meyer et al. |
| 2006/0292982 A1 | 12/2006 | Ye et al. |
| 2007/0071025 A1 | 3/2007 | Bergstrom et al. |
| 2007/0081483 A1 | 4/2007 | Jang et al. |
| 2007/0081513 A1 | 4/2007 | Torsner |
| 2007/0098006 A1 | 5/2007 | Parry et al. |
| 2007/0099619 A1 | 5/2007 | Parekh et al. |
| 2007/0104151 A1 | 5/2007 | Papasakellariou et al. |
| 2007/0117579 A1 | 5/2007 | Cai et al. |
| 2007/0133458 A1 | 6/2007 | Chandra et al. |
| 2007/0135080 A1 | 6/2007 | Islam et al. |
| 2007/0140115 A1 | 6/2007 | Bienas et al. |
| 2007/0147326 A1 | 6/2007 | Chen |
| 2007/0206531 A1* | 9/2007 | Pajukoski et al. .............. 370/329 |
| 2007/0218930 A1 | 9/2007 | Kuo |
| 2007/0254662 A1 | 11/2007 | Khan et al. |
| 2007/0274253 A1 | 11/2007 | Zhang et al. |
| 2008/0004054 A1 | 1/2008 | Barbaresi et al. |
| 2008/0031253 A1 | 2/2008 | Kim et al. |
| 2008/0043619 A1 | 2/2008 | Sammour et al. |
| 2008/0069031 A1 | 3/2008 | Zhang et al. |
| 2008/0095105 A1 | 4/2008 | Sundberg et al. |
| 2008/0130643 A1 | 6/2008 | Jain et al. |
| 2008/0137564 A1 | 6/2008 | Herrmann |
| 2008/0212541 A1 | 9/2008 | Vayanos et al. |
| 2008/0232291 A1 | 9/2008 | Hus et al. |
| 2008/0267136 A1 | 10/2008 | Baker et al. |
| 2008/0285501 A1 | 11/2008 | Zhang et al. |
| 2009/0011769 A1 | 1/2009 | Park et al. |
| 2009/0129330 A1 | 5/2009 | Kim et al. |
| 2009/0156194 A1 | 6/2009 | Meylan |
| 2009/0175241 A1 | 7/2009 | Ohta et al. |
| 2009/0175253 A1 | 7/2009 | Wu et al. |
| 2009/0185477 A1 | 7/2009 | Lee et al. |
| 2009/0319850 A1 | 12/2009 | Baek et al. |
| 2009/0323624 A1 | 12/2009 | Kim |
| 2009/0323646 A1 | 12/2009 | Ketchum et al. |
| 2010/0014430 A1 | 1/2010 | Oka et al. |
| 2010/0034095 A1 | 2/2010 | Ho et al. |
| 2010/0103899 A1 | 4/2010 | Kwak et al. |
| 2010/0105334 A1 | 4/2010 | Terry et al. |
| 2010/0226263 A1 | 9/2010 | Chun et al. |
| 2011/0038376 A1 | 2/2011 | Wiemann et al. |

FOREIGN PATENT DOCUMENTS

| | | |
|---|---|---|
| CN | 1649285 | 8/2005 |
| CN | 1656840 | 8/2005 |
| CN | 1658545 | 8/2005 |
| CN | 1663158 | 8/2005 |
| CN | 1669350 | 9/2005 |
| CN | 1692661 | 11/2005 |
| CN | 101248699 | 10/2012 |
| DE | 10305358 | 7/2004 |
| EP | 0978958 | 2/2000 |
| EP | 1009184 | 6/2000 |
| EP | 1172766 | 1/2002 |
| EP | 1213939 | 6/2002 |
| EP | 1261222 | 11/2002 |
| EP | 1392074 | 2/2004 |
| EP | 1441473 | 7/2004 |
| EP | 1478203 | 11/2004 |
| EP | 1511245 | 3/2005 |
| EP | 1551113 | 7/2005 |
| EP | 1557968 | 7/2005 |
| EP | 1212853 | 8/2005 |
| EP | 1599063 | 11/2005 |
| EP | 1605724 | 12/2005 |
| EP | 1684538 | 1/2006 |
| EP | 1641189 | 3/2006 |
| JP | 06-013959 | 1/1994 |
| JP | 06-121001 | 4/1994 |
| JP | 09-055693 | 2/1997 |
| JP | 09-186704 | 7/1997 |
| JP | 09-327072 | 12/1997 |
| JP | 11177621 | 7/1999 |
| JP | 11215192 | 8/1999 |
| JP | 11-308671 | 11/1999 |
| JP | 11331949 | 11/1999 |
| JP | 2000032088 | 1/2000 |
| JP | 2000-151494 | 5/2000 |
| JP | 2000-175271 | 6/2000 |
| JP | 2000-184428 | 6/2000 |
| JP | 2001-095031 | 4/2001 |
| JP | 2001-298770 | 10/2001 |
| JP | 2001522557 | 11/2001 |
| JP | 2002501695 | 1/2002 |
| JP | 2002064589 | 2/2002 |
| JP | 2002135231 | 5/2002 |
| JP | 2002-374321 | 12/2002 |
| JP | 2003-008635 | 1/2003 |
| JP | 2003504942 | 2/2003 |
| JP | 2003504968 | 2/2003 |
| JP | 2003078480 | 3/2003 |
| JP | 2003-116172 | 4/2003 |
| JP | 2003-174470 | 6/2003 |
| JP | 2003-333661 | 11/2003 |
| JP | 2004-128967 | 4/2004 |
| JP | 2004-312771 | 11/2004 |
| JP | 2004-320165 | 11/2004 |
| JP | 2004343258 | 12/2004 |
| JP | 2004349884 | 12/2004 |
| JP | 2005500761 | 1/2005 |
| JP | 2005-072634 | 3/2005 |
| JP | 2005510950 | 4/2005 |
| JP | 2005-517369 | 6/2005 |
| JP | 2005522923 | 7/2005 |
| JP | 2005-217743 | 8/2005 |
| JP | 2005525066 | 8/2005 |
| JP | 2005525720 | 8/2005 |
| JP | 2005-236988 | 9/2005 |
| JP | 2005-237013 | 9/2005 |
| JP | 2005-244958 | 9/2005 |
| JP | 2005-278167 | 10/2005 |
| JP | 2005-536168 | 11/2005 |
| JP | 2005-539462 | 12/2005 |
| JP | 2006-014372 | 1/2006 |
| JP | 2006-020044 | 1/2006 |
| JP | 2006-025437 | 1/2006 |
| JP | 2006-505998 | 2/2006 |
| JP | 2006-352705 | 12/2006 |
| JP | 2007536790 | 12/2007 |
| JP | 2008-510424 | 4/2008 |

(56) References Cited

FOREIGN PATENT DOCUMENTS

| | | |
|---|---|---|
| JP | 2009-284532 | 12/2009 |
| KR | 1020010111634 | 12/2001 |
| KR | 1020010111637 | 12/2001 |
| KR | 1020020077817 | 10/2002 |
| KR | 1020020096900 | 12/2002 |
| KR | 20030081836 | 10/2003 |
| KR | 1020040048675 | 6/2004 |
| KR | 1020040058638 | 7/2004 |
| KR | 1020040064867 | 7/2004 |
| KR | 1020040089937 | 10/2004 |
| KR | 1020050019945 | 3/2005 |
| KR | 10-20050031268 | 4/2005 |
| KR | 1020050046305 | 5/2005 |
| KR | 10-2005-0081511 | 8/2005 |
| KR | 1020050078635 | 8/2005 |
| KR | 1020050078636 | 8/2005 |
| KR | 1020050078640 | 8/2005 |
| KR | 10-2005-0110533 | 11/2005 |
| KR | 1020050119054 | 12/2005 |
| RU | 2168278 | 5/2001 |
| RU | 2191479 | 10/2002 |
| RU | 2232469 | 7/2004 |
| RU | 2237380 | 9/2004 |
| RU | 2263415 | 10/2005 |
| RU | 2270526 | 2/2006 |
| RU | 2009106289 | 8/2010 |
| TW | 407407 | 10/2000 |
| TW | 548916 | 8/2003 |
| TW | 552815 | 9/2003 |
| TW | 586283 | 5/2004 |
| TW | 589818 | 6/2004 |
| TW | 592412 | 6/2004 |
| TW | I228008 | 2/2005 |
| TW | I229268 | 3/2005 |
| TW | I229514 | 3/2005 |
| TW | 200522579 | 7/2005 |
| TW | I237478 | 8/2005 |
| TW | I239731 | 9/2005 |
| TW | I239756 | 9/2005 |
| TW | I242951 | 11/2005 |
| TW | I253824 | 4/2006 |
| TW | 280755 | 5/2007 |
| WO | 99/60729 | 11/1999 |
| WO | 99/63713 | 12/1999 |
| WO | 0120924 | 3/2001 |
| WO | 01/37473 | 5/2001 |
| WO | 01/93462 | 12/2001 |
| WO | 02/39697 | 5/2002 |
| WO | 02/39760 | 5/2002 |
| WO | 02/43403 | 5/2002 |
| WO | 02/47417 | 6/2002 |
| WO | 02/075442 | 9/2002 |
| WO | 03/007636 | 1/2003 |
| WO | 03/017691 | 2/2003 |
| WO | 03/043259 | 5/2003 |
| WO | 03/047155 | 6/2003 |
| WO | 03/056723 | 7/2003 |
| WO | 2004/030392 | 4/2004 |
| WO | 2004/030393 | 4/2004 |
| WO | 2004/034656 | 4/2004 |
| WO | 2004/045234 | 5/2004 |
| WO | 2004/079971 | 9/2004 |
| WO | 2004/089030 | 10/2004 |
| WO | 2004/091130 | 10/2004 |
| WO | 2004/102901 | 11/2004 |
| WO | 2004100598 | 11/2004 |
| WO | 2005/006660 | 1/2005 |
| WO | 2005/018144 | 2/2005 |
| WO | 2005/018269 | 2/2005 |
| WO | 2005/034418 | 4/2005 |
| WO | 2005/036917 | 4/2005 |
| WO | 2005/039134 | 4/2005 |
| WO | 2005048616 | 5/2005 |
| WO | 2005/050918 | 6/2005 |
| WO | 2005055472 | 6/2005 |
| WO | 2005/071887 | 8/2005 |
| WO | 2005/074312 | 8/2005 |
| WO | 2005/078967 | 8/2005 |
| WO | 2005/079021 | 8/2005 |
| WO | 2005072073 | 8/2005 |
| WO | 2005/088886 | 9/2005 |
| WO | 2005/099125 | 10/2005 |
| WO | 2005/101738 | 10/2005 |
| WO | 2005/109695 | 11/2005 |
| WO | 2005/109837 | 11/2005 |
| WO | 2005/117317 | 12/2005 |
| WO | 2005/119941 | 12/2005 |
| WO | 2005/125125 | 12/2005 |
| WO | 2005125020 | 12/2005 |
| WO | 2006/011953 | 2/2006 |
| WO | 2006/012946 | 2/2006 |
| WO | 2006/033552 | 3/2006 |
| WO | 2006/118393 | 11/2006 |
| WO | 2007066883 | 6/2007 |
| WO | 2007/078155 | 7/2007 |
| WO | 2007/095966 | 8/2007 |
| WO | 2007091831 | 8/2007 |

OTHER PUBLICATIONS

Nortel, "Proposal for the Uplink Multiple Access Scheme for E-UTRA," 3GPP TSG RAN WG1 #42bis, R1-051165, Oct. 2005, 18 pages.
Japan Patent Office Application Serial No. 2011-219329, Office Action dated Jun. 4, 2013, 3 pages.
IPWireless, et al., "RACH access optimisation," 3GPP TSG RAN WG2 #59, R2-073186, Jun. 2007, 6 pages.
European Patent Office Application Serial No. 13163775.3, Search Report dated May 27, 2013, 6 pages.
Taiwan Intellectual Property Office Application Serial No. 096104339, Office Action dated May 30, 2013, 5 pages.
Korean Intellectual Property Office Application Serial No. 10-2007-0000097, Notice of Allowance dated Feb. 6, 2013, 2 pages.
European Patent Office Application Serial No. 07746856.9 Search Report dated Jan. 31, 2013, 8 pages.
European Patent Office Application Serial No. 07747056.5 Search Report dated Feb. 14, 2013, 7 pages.
Korean Intellectual Property Office Application Serial No. 10-2006-0085190, Office Action dated Feb. 25, 2013, 5 pages.
3rd Generation Partnership Project (3GPP); "Technical Specification Group Radio Access Network; Radio Interface Protocol Architecture (Release 6)," 3GPP TS 25.301 V6.4.0, Sep. 2005, 48 pages.
European Patent Office Application Serial No. 07700814.2, Office Action dated Feb. 18, 2013, 5 pages.
Korean Intellectual Property Office Application Serial No. 10-2006-0088273, Notice of Allowance dated Mar. 28, 2013, 5 pages.
Taiwan Intellectual Property Office Application Serial No. 096100583, Office Action dated Mar. 18, 2013, 8 pages.
European Patent Office Application Serial No. 07747052.4, Search Report dated Mar. 14, 2013, 8 pages.
Korean Intellectual Property Office Application Serial No. 10-2006-0107104, Notice of Allowance dated Apr. 12, 2013, 2 pages.
European Patent Office Application Serial No. 07700867.0, Search Report dated Feb. 27, 2013, 9 pages.
European Patent Office Application Serial No. 07700858.9, Search Report dated Mar. 5, 2013, 6 pages.
3rd Generation Partnership Project (3GPP), "Technical Specification Group GERAN; Packet-switched handover for GERAN A/Gb mode; Stage 2 (Release 6)", 3GPP TS 43.129 V6.6.0, Jan. 2006, 70 pages, XP50378285.
Taiwan Intellectual Property Office Application Serial No. 096104339, Office Action dated Dec. 6, 2012, 6 pages.
Korean Intellectual Property Office Application Serial No. 10-2006-0107104, Office Action dated Dec. 20, 2012, 15 pages.
European Patent Office Application Serial No. 06812408.0, Search Report dated Nov. 22, 2012, 6 pages.
United States Patent and Trademark Office U.S. Appl. No. 12/159,981, Office Action dated Jan. 18, 2013, 11 pages.
European Patent Office Application Serial No. 11001176.4, Search Report dated Oct. 24, 2012, 8 pages.

(56) References Cited

OTHER PUBLICATIONS

Xu, H., et al.; "Performance Analysis on the Radio Link Control Protocol of UMTS System"; 2002 IEEE 56th Vehicular Technology Conference Proceedings; pp. 2026-2030; Sep. 2002.
M. Haardt et al., "The TD-CDMA Based UTRA TDD Mode," IEEE Journal on Selected Areas in Communications, vol. 18, No. 8, pp. 1375-1385, Aug. 2000.
Siemens, "States in E-UTRAN," R2-052051, 3GPP TSG-RAN WG RAN2#48, Aug. 2005.
China Mobile Communications Co., "RRC States Analysis in LTE," R2-052140, 3GPP TSG RAN WG2 #48, Aug. 2005.
Qualcomm Europe, "Signaling optimization for E-UTRAN," R2-052407, 3GPP TSG-RAN WG 2 meeting #48-bis, Oct. 2005.
Panasonic, "E-UTRA Transport and Logical Channels," R2-052860, 3GPP TSG RAN WG2#49, Nov. 2005.
Qualcomm, "Need for MAC-hs segmentation mechanism," R2-020769, 3GPP TSG-RAN WG2 meeting #28, Apr. 2002.
Motorola et al., "MAC-e/es header and functional split," R2-042360, 3GPP TSG RAN WG2 Meeting#45, Nov. 2004.
Ericsson, "User plane protocol enhancements," R2-052749, TSG-RAN WG2 Meeting #48bis, Oct. 2005.
LG Electronics Inc., "MAC Enhancement," R2-060561, 3GPP TSG-RAN WG2 #51, Feb. 2006.
3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321, V8.4.0, Dec. 2008.
LG Electronics Inc., "UE State Transition in LTE_ACTIVE," R2-061002, 3GPP TSG-RAN WG2 #52, Mar. 2006.
IPWireless, "Layer 2 functions for LTE," R2-052377, 3GPP TSG RAN WG2 #48bis, Oct. 2005.
LG Electronics Inc., "MAC Architecture of LTE," R2-060105, 3GPP TSG-RAN WG2 #50, Jan. 2006.
LG Electronics Inc., "HARQ and ARQ Operation," R2-060563, 3GPP TSG-RAN WG2 #51, Feb. 2006.
LG Electronics Inc., "Discussion on RLC PDU Structure," R2-070721, 3GPP TSG-RAN WG2 #57, Feb. 2007.
3rd Generation Partnership Project (3GPP), "Technical Specification Group Radio Access Network; Introduction of the Multimedia Broadcast Multicast Service(MBMS) in the Radio Access Network (RAN); Stage 2 (Release 6)", 3GPP TS 25.346 V6.7.0, Dec. 2005.
QUALCOMM, "Max Number of MAC-hs Header Extensions", 3GPP TSG-RAN WG2 #44, R2-042023, Oct. 2004.
United States Patent and Trademark Office U.S. Appl. No. 12/305,920, Final Office Action dated Oct. 4, 2012, 55 pages.
United States Patent and Trademark Office U.S. Appl. No. 13/410,185, Office Action dated Oct. 10, 2012, 71 pages.
United States Patent and Trademark Office U.S. Appl. No. 13/410,221, Office Action dated Oct. 15, 2012, 72 pages.
European Patent Office Application Serial No. 07708765.8, Search Report dated Sep. 28, 2012, 10 pages.
European Patent Office Application Serial No. 07700865.4, Search Report dated Nov. 8, 2012, 6 pages.
Ericsson, "Solution for sending NAS together with RRC connection request," R2-071817, 3GPP TSG-RAN WG2#58, May 2007.
LG Electronics Inc., "Default SRB for initial access," R2-061958, 3GPP TSG-RAN WG2 LTE Ad-hoc, Jun. 2006.
QUALCOMM Europe, "Access procedure for LTE", R2-060362, 3GPP TSG-RAN WG2 LTE, Feb. 2006, 4 pages, XP50130362.
European Patent Office Application Serial No. 07700868.8, Office Action dated Nov. 2, 2012, 7 pages.
Philips, "Random Access considerations and discussion of L1 questions from RAN2", R1-060143, 3GPP TSG RAN WG1 LTE Adhoc, Jan. 2006, 4 pages, XP50417365.
RAN2, "LTE L1 related questions to RAN1", R1-060061, 3GPP TSG RAN WG1 LTE Ad Hoc Meeting, Jan. 2006, 4 pages, XP50491669.
Ericsson, "Initial, Random Access and Identity Handling", R2-060592, TSG-RAN WG2 Meeting #51, Feb. 2006, 8 pages, XP50130549.
European Patent Office Application Serial No. 11004852.7, Search Report dated Nov. 5, 2012, 9 pages.
European Patent Office Application Serial No. 07747053.2, Search Report dated Nov. 13, 2012, 6 pages.
LG Electronics, Inc., "Framing in the MAC Entity," 3GPP TSG-RAN WG2 #52, R2-061012, Mar. 27, 2006.
LG Electronics, Inc., "HARQ and ARQ Operation," 3GPP TSG-RAN WG2 #50, R2-060106, Jan. 9, 2006.
Huawei, "Further Considerations on Multiplexing Method of Shared Control Channel in Uplink Single-Carrier FDMA," 3GPP TSG-RAN WG1 #43, R1-051430, Nov. 7, 2005.
NTT Docomo, et al., "Multiplexing Method of Shared Control Channel in Uplink Single-Carrier FDMA Radio Access," 3GPP TSG-RAN WG1 #42bis, R1-051143, Oct. 10, 2005.
Philips, "Evolving Paging Indicators for LTE," 3GPP TSG-RAN WG2 #49, R2-052985, Nov. 7, 2005.
Sarkar, S., et al., "Common-Channel Soft Handoff in CDMA2000-The Paging Channel," IEEE Transactions on Microwave Theory and Techniques, Jun. 2000, vol. 48, Issue 6, pp. 938-950.
NTT Docomo, et al., "Paging Channel Structure for E-UTRA Downlink," 3GPP TSG-RAN WG1 LTE, R1-060034, Jan. 23, 2006.
Motorola, "Paging Channel Design for E-UTRA," 3GPP TSG RAN1 LTE, R1-061712, Jun. 27, 2006.
Ericsson, "E-UTRA Random Access," TSG-RAN WG1 #43, R1-051445, Nov. 7, 2005.
RAN WG2, "Answer to RAN1 questions on MBMS," 3GPP RAN WG2 Meeting #43, R2-041907, XP-50126506, Aug. 2004, 4 pages.
European Patent Office Application Serial No. 07708430.9, Search Report dated Jun. 5, 2013, 9 pages.
European Patent Office Application Serial No. 07700845.6, Office Action dated May 22, 2013, 6 pages.
LG Electronics Inc., "HARQ and ARQ Operation," 3GPP TSG-RAN WG2 #50, R2-060106, XP-008128941, Jan. 2006, 5 pages.
Korean Intellectual Property Office Application Serial No. 10-2007-0000767, Office Action dated Jun. 19, 2013, 3 pages.

* cited by examiner

METHOD OF COMMUNICATING DATA IN A WIRELESS MOBILE COMMUNICATIONS SYSTEM USING MESSAGE SEPARATION AND MOBILE TERMINAL FOR USE WITH THE SAME

CROSS-REFERENCE TO RELATED APPLICATIONS

This application is the National Stage filing under 35 U.S.C. §371 of International Application No. PCT/KR2007/003024, filed on Jun. 21, 2007, which claims the benefit of earlier filing date and right of priority to Korean Application No. 10-2007-0060991, filed on Jun. 21, 2007, and also claims the benefit of U.S. Provisional Application Ser. No. 60/815, 722, filed on Jun. 21, 2006.

DISCLOSURE OF INVENTION

Technical Solution

The present disclosure relates to an E-UMTS (Evolved Universal Mobile Telecommunications System) and, more particularly, to a method for effectively transmitting and receiving access information between a terminal and a base station using a message separation for a RRC CONNECTION REQUEST message.

FIG. 1 is a network structure of the E-UMTS, a mobile communication system applicable to the related art and the present disclosure.

The E-UMTS system has been evolved from the UMTS system, for which the 3GPP is proceeding with the preparation of the basic specifications applicable thereto. The E-UMTS system can be classified as an LTE (Long Term Evolution) system.

With reference to FIG. 1, the E-UMTS network is divided into an E-UTRAN and a CN (Core Network). The E-UTRAN includes a terminal (UE (User Equipment)), a base station (eNB or eNode B) and an AG (Access Gateway) (which also can be expressed as 'MME/S-GW'). The AG can be divided into a part for handling user traffic and a part for handling control traffic. The AG part for handling new user traffic and the AG part for handling control traffic can communicate with each other via newly defined interface. One or more cells may exist in a single eNode B (eNB), and an interface for transmitting the user traffic and the control traffic can be used between the eNode Bs.

The CN may include an AG, a node for user registration of the UE, and the like. Also, in the UMTS of FIG. 1, an interface for discriminating the E-UTRAN and the CN can be used. An Si interface can connect a plurality of nodes (i.e., in a many-to-many manner) between the eNode B and the AG. The eNode Bs are connected with each other through an X2 interface, and the X2 interface is always present between adjacent eNode Bs in a meshed network structure.

Layers of a radio interface protocol between the UE and a network can be divided into a first layer (L1), a second layer (L2) and a third layer (L3) based upon the three lower layers of an open system interconnection (OSI) standard model that is well-known in the art of communication systems.

The first layer (L1) provides an information transfer service using a physical channel, and a radio resource control (RRC) layer positioned at the third layer (L3) serves to control radio resources between the terminal and the network, for which the RRC layer exchanges an RRC message between the terminal and the network. The RRC layer can be distributed so as to be positioned in network nodes such as the eNode Bs and the AGs, etc., or can be positioned only in the eNode Bs or in the AGs.

FIG. 2 illustrates a structure of the radio access interface protocol between the terminal and the UTRAN based upon various 3GPP wireless access network standards.

The radio access interface protocol has horizontal layers including a physical layer, a data link layer and a network layer, and has vertical planes including a user plane for transmitting data information and a control plane for transmitting control signals.

The protocol layers can be divided into a first layer (L1), a second layer (L2) and a third layer (L3) based upon the three lower layers of an open system interconnection (OSI) standard model that is well-known in the art of communication systems. Each layer of the control plane of the radio protocol in FIG. 2 and the user plane of the radio protocol in FIG. 3 will now be described.

The physical layer, the first layer, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the second layer provides a service to a radio link control (RLC) layer, an upper layer, via a logical channel. The RLC layer of the second layer reliably supports a data transmission. The function of the RLC layer can be implemented as a function block within the MAC layer, and in this case, the RLC layer may not be present. A PDCP layer of the second layer performs a header compression function for reducing unnecessary control information so that data transmitted by using IP packets such as IPv4 or IPv6 can be effectively transmitted via a radio interface with a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

Downlink transport channels for transmitting data from the network to the terminal, include a broadcast channel (BCH) for transmitting system information and a downlink shared channel (SCH) for transmitting the user traffic or the control message. Downlink multicast, traffic of a broadcast service or a control message can be transmitted through the downlink SCH or through a separate downlink multicast channel (MCH).

Uplink transport channels for transmitting data from the terminal to the network include a random access channel (RACH) for transmitting an initial control message and an uplink SCH for transmitting the user traffic and the control message.

A RRC connection and a signaling connection will be described in more detail as follows. In order to perform communications, a terminal (UE) needs to have a RRC connection with the UTRAN and a signaling connection with the Core Network (CN). The terminal transmits and/or receives a terminal's control information with the UTRAN or the CN via the RRC connection and the signaling connection.

A Random Access Channel of a WCDMA will be described in more detail as follows.

The Random Access Channel (RACH) is used to transfer a short length data on an uplink, and some of the RRC message (i.e., RRC Connection Request Message, Cell Update Message, URA Update Message) is transmitted via the RACH. The RACH is mapped to a Common Control Channel (CCCH), a Dedicated Control Channel (DCCH) and a Dedicated Traffic Channel (DTCH), and then the RACH is mapped to a Physical Random Access Channel.

A PRACH, which is an uplink physical channel, is divided into a preamble part and a message part. The preamble part is used to properly control a transmission power for a message transmission (i.e., a power ramping function] and is used to avoid a collision between multiple terminals. The message part is used to transmit a MAC PDU that was transferred from the MAC to the Physical channel.

When the MAC of the terminal instructs a PRACH transmission to the physical layer of the terminal, the physical layer of the terminal first selects one access slot and one (preamble) signature, and transmits the preamble on the PRACH to an uplink. Here, the preamble is transmitted within a particular the length of access slot duration (e.g., 1.33 ms). One signature is selected among the 16 different signatures within a first certain length of the access slot, and it is transmitted.

If the preamble is transmitted from the terminal, a base station transmits a response signal via an Acquisition indicator channel (AICH) which is a downlink physical channel. The AICH, in response to the preamble, transmits a signature that was selected within the first certain length of the access slot. Here, the base station transmits an ACK response or a NACK response to the terminal by means of the transmitted signature from the AICH.

If the ACK response is received, the terminal transmits a 10 ms or 20 ms length of the message part using an OVSF code that correspond with the transmitted signature. If the NACK response is received, the MAC of the terminal instructs the PRACH transmission again to the physical layer of the terminal after a certain time period. Also, if no AICH is received with respect to the transmitted preamble, the terminal transmits a new preamble with a higher power compared to that used for the previous preamble after a predetermined access slot.

In LTE system, an initial access/connection processing from a terminal (UE) to a network will be described in more detail as follows.

As shown in FIG. 4, an UE transmits a Random Access Preamble (which may also referred as Message 1) (S1) to a eNB by selecting available a Random Access Signature and Random Access Occasion through system information received from a RRC signal of the eNB. After successfully receiving the Random Access Preamble (Message 1) of the UE, the eNB transmits a Random Access Response (which may also be referred as Message 2) to the UE (S2). The Random Access Response (Message 2) may include an uplink Time synchronization (or Time Advance; TA) information with the eNB, C-RNTI (which is used to identity a given UE in a give cell), or an uplink radio resource allocation information (i.e., Initial grant) for transmitting a RRC CONNECTION REQUEST message, etc. After receiving the Random Access Response (Message 2), the UE transmits the RRC CONNECTION REQUEST message (which may also referred as Message 3) (S3) according to the allocated radio resource information included in the Random Access Response. After receiving the RRC CONNECTION REQUEST message (Message 3) from the UE, the eNB transmits a RRC contention resolution message (which may also be referred as Message 4) to the UE.

In the related art, through the Message 2, the UE generally obtains necessary uplink radio resource information for transmitting the Message 3. In other words, the eNB determines an amount of a necessary radio resource (i.e., time, frequency, transmission format etc) for the UE to transmit the Message 3 based on the Message 1 received from the UE, and then transmits an allocated radio resource with the Message 2.

In this respect, however, due to the limited amount of information in the Message 1 from the UE, there is a drawback that it is impossible to estimate an accurate radio resource allocation for transmitting the Message 3 by the eNB. Therefore, if the eNB can not provide a proper radio resource allocation (which will be used for transmitting the Message 3) to the UE, a time delay for data transmission or a waste of radio resource can be happened because of a radio resource shortage for the Message 3, as shown in FIG. 5.

One exemplary feature of the present disclosure is to provide a method of transmitting and receiving radio access information using a message separation in a wireless mobile communications system.

To implement at least the above feature in whole or in parts, the present disclosure may provide a method of communicating data in a wireless communications system, transmitting a random access preamble; receiving a random access response in response to the random access preamble, wherein the random access response includes information related to at least one allocated radio resource which will be used for transmitting a next scheduled data; determining at least one required radio resource for transmitting the next scheduled data; and generating the next scheduled data by considering a characteristic of at least one among the at least one allocated radio resource and the determined at least one required radio resource.

The next scheduled data may be a RRC CONNECTION REQUEST message or an initial uplink grant, and the next scheduled data may include a NonAcess Stratum (NAS) message such as Attach Request, Routing Area Update Request, Detach Request, and Service Request, etc.

When generating the next scheduled data by a terminal, the determined at least one required radio resource may compared with the at least one allocated radio resource. The next scheduled data may be separately generated into two or more data groups if the at least one allocated radio resource is below or smaller than the determined at least one required radio resource, and then may transmit to a base station separately.

A Radio Resource Control (RRC) signal from the base station to a terminal may designates what information of the next scheduled data should be included in which data group, and the RRC signal may be either system information or a paging message. Also, each separated data group may include an identity for indicating what type of information is included in the next scheduled data of the each separated data group.

Also, when generating the next scheduled data by a terminal, the determined at least one required radio resource may compared with a certain threshold value. After performing such comparison, the determined at least one required radio resource may only need to be compared with the at least one allocated radio resource for generating the next scheduled data when the determined at least one required radio resource is below or smaller the threshold value.

The present disclosure may also provide a method of communicating data in a wireless communications system, receiving a random access preamble; transmitting a random access response in response to the received the random access preamble, wherein the random access response includes information related to at least one allocated radio resource for transmitting a next scheduled data by a terminal; and receiving the next scheduled data from the terminal, wherein the terminal determines at least one required radio resource for transmitting the next scheduled data, and wherein the next scheduled data is generated by considering a characteristic of at least one among the at least one allocated radio resource and the determined at least one required radio resource by the terminal before transmitting the next scheduled data.

The present disclosure may also provide a mobile terminal for communicating data in a wireless communications system, a transceiver adapted to transmit or receive the data; a memory adapted to store the data transmitted or received via the transceiver or from an external source; and a processor cooperating with the transceiver and the memory and adapted to perform the steps of, transmitting a random access preamble; receiving a random access response in response to the random access preamble, wherein the random access response includes information related to at least one allocated radio resource which will be used for transmitting a next scheduled data; determining at least one required radio resource for transmitting the next scheduled data; and generating the next scheduled data by considering a characteristic of at least one among the at least one allocated radio resource and the determined at least one required radio resource.

The foregoing and other objects, features, aspects and advantages of the present disclosure will become more apparent from the following detailed description of the prsent disclosure when taken in conjunction with the accompanying drawings.

The accompanying drawings, which are included to provide a further understanding of the disclosure and are incorporated in and constitute a part of this specification, illustrate embodiments of the disclosure and together with the description serve to explain the principles of the disclosure.

One aspect of the present disclosure relates to the recognition by the present inventors about the problems of the related art as described above, and further explained hereafter. Based upon this recognition, the features of the present disclosure have been developed.

Although the present disclosure is shown to be implemented in a mobile communication system, such as a UMTS developed under 3GPP specifications, the present disclosure can also be applied to other communication systems operating in conformity with different standards and specifications.

As network technology continues to develop, it is foreseen that RNCs may no longer be necessary in future networks, because Node Bs with enhanced capabilities, or other types of network entities (e.g. so-called Access Gateways) may handle the operations performed by currently existing RNCs. Such long-term evolution issues further support the need to develop improved radio admission control techniques to be used in admitting new terminals (or establishing new user links) and supporting newly developing enhanced services for a greater number of terminals being managed by the network.

The present disclosure provides a method for effectively transmitting data (i.e., access information) from a terminal (UE) to a base station (eNB). More particularly, the present disclosure provides that the terminal transmits an access information (i.e., RRC CONNECTION REQUEST message) based upon an uplink radio resource allocated by the base station to the base station after properly configuring or generating of the access information, to thus optimize transmission efficiency (i.e., minimum time delay, efficient use of radio resource).

Preferably, the uplink radio resource may be used for transmitting the Message 3, and information related to the uplink radio resource may be provided from the base station to the terminal through the Message 2.

Preferably, the Message 3 may be a RRC CONNECTION REQUEST message.

Preferably, the Message 3 may include a part or all of NAS (NonAccess Stratum) message (i.e., Attach Request, Routing Area Update Request, Detach Request, Service Request, etc)

According to the present disclosure, a method of generating or configuring a RRC CONNECTION REQUEST message by a terminal will be described in more detail as follows.

When a bit number(s) (or any other parameters that represent radio resource(s)) for an allocated radio resource that received through the Message 2 is equal or greater than a bit number(s) of necessary or needed information to generate the RRC CONNECTION REQUEST message (Message 3), the terminal may generate a RRC CONNECTION REQUEST message including all the necessary or needed information, then may transmit it to the base station.

Figure 1:
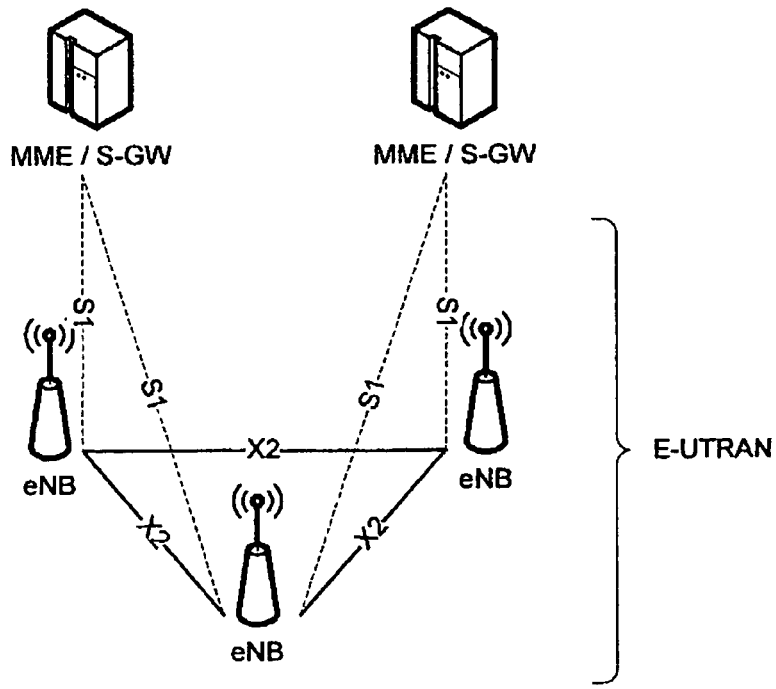
FIG. 1 shows an exemplary network structure of an E-UMTS, a mobile communication system for which a related art and the mobile terminal are applied.
Figure 2:
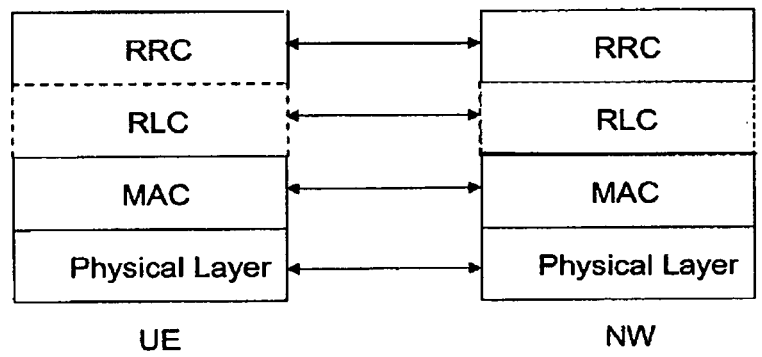
FIG. 2 is an exemplary structure of a control plane of a radio interface protocol between a terminal and a UTRAN based on a 3GPP wireless access network specification.
Figure 3:
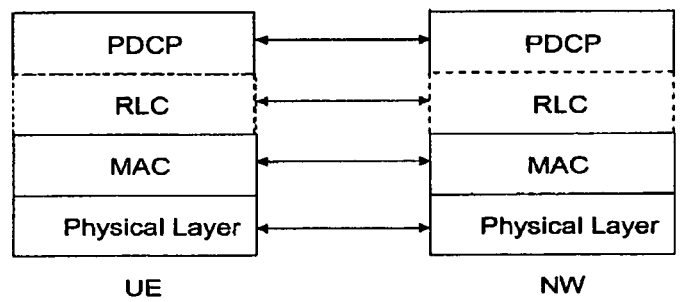
FIG. 3 is an exemplary structure of a user plane of the radio interface protocol between the terminal and the UTRAN based on the 3GPP wireless access network specification.
Figure 4:
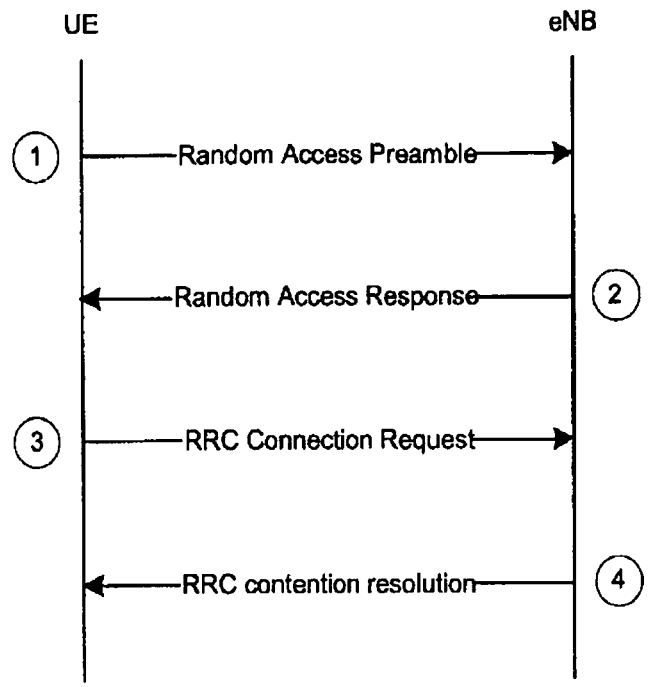
FIG. 4 shows an exemplary initial connection process between an UE and a eNB.
Figure 5:
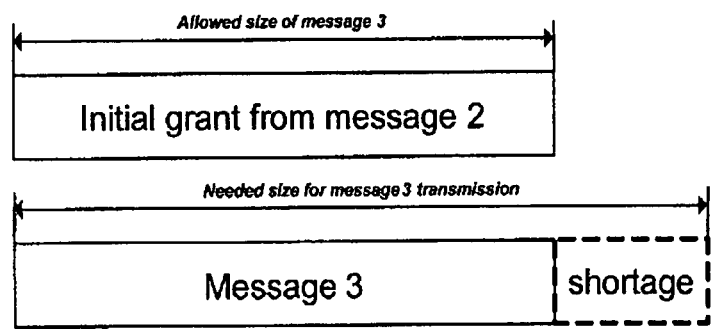
FIG. 5 shows a problem of transmitting the Message 3 due to a shortage of allocated radio resource.
Figure 6:
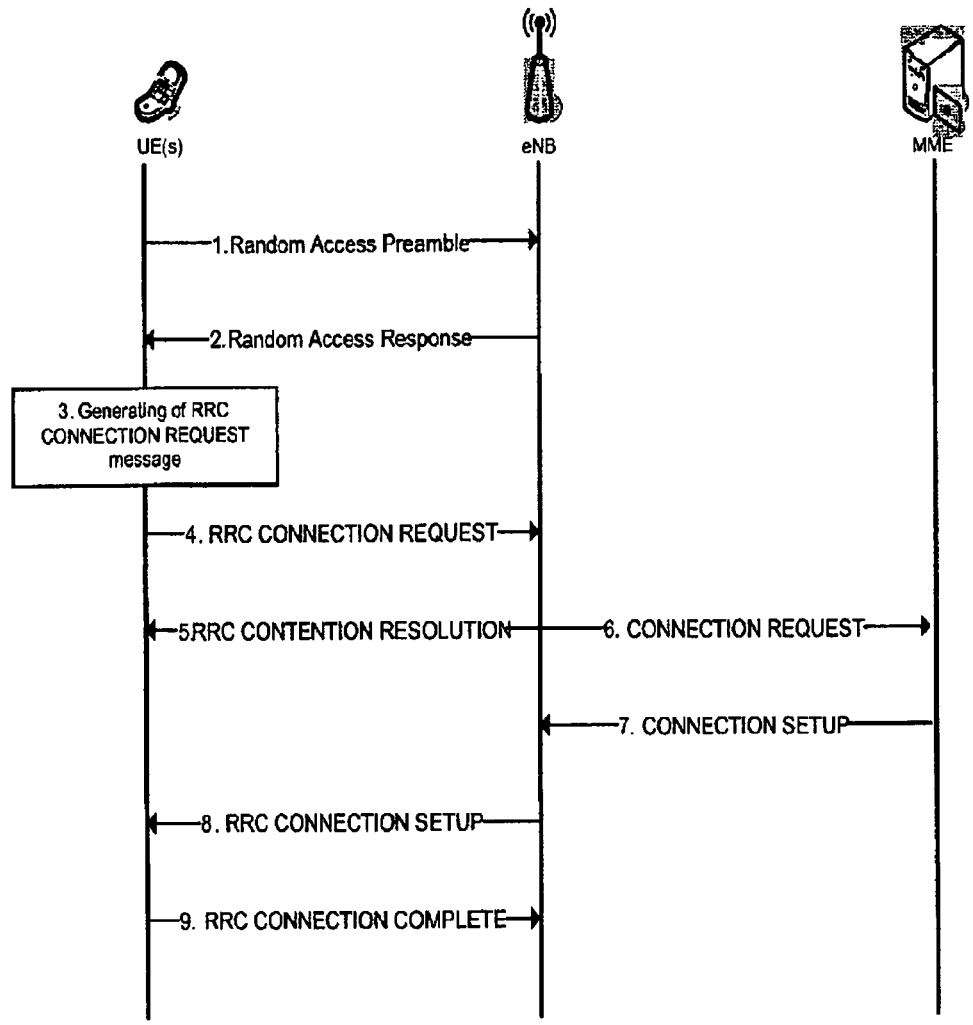
FIG. 6 shows an exemplary RRC connection procedure when enough radio resource(s) are provided or allocated by the eNB.

FIG. 6 shows an exemplary RRC connection procedure according to the present disclosure when enough radio resource(s) are provided or allocated by the eNB.

With reference to FIG. 6, a terminal (UE) may transmit a random access preamble for a RRC connection with a base station (eNB). (S1) The base station may transmit a random access response to the terminal in response to the received random access preamble. (S2) Here, the random access response may include uplink radio resource(s) allocated information for transmitting a RRC CONNECTION REQUEST message by the terminal.

After receiving the random access response, the terminal may check the uplink radio resource(s) included in the random access response, then may calculate or determine a necessary or needed bit number(s) for transmitting the RRC CONNECTION REQUEST message. In other words, after calculating or determining an amount of allocated radio resource(s) from the base station with a number of bit(s) which needed to be transmitted, if necessary information for transmitting the RRC CONNECTION REQUEST message can be possibly transmitted through the allocated radio resource(s), the terminal may generate the RRC CONNECTION REQUEST message including with all necessary information. (S3) In this case, the RRC CONNECTION REQUEST message may include necessary information for a connection (i.e., S1 connection) between the base station and MME (Mobility Management Entity) as well as necessary information for a connection between the terminal and base station. In some cases, the calculation of the allocated radio resource(s) amount may not be necessary. That is, if the necessary or needed bit number(s) for transmitting the RRC CONNECTION REQUEST message is below than a certain threshold value, such message may directly transmit using the radio resource(s), which were allocated by the Message 2, without having a step of calculation. Here, the threshold value may provide from the base station to the terminal via system information or a paging message.

After the generation of the RRC CONNECTION REQUEST message, the terminal may transmit the RRC CONNECTION REQUEST message to the base station. (S4) In order to provide quick resolution for a collision between the different terminals that having same preamble (signature) simultaneously, the base station may transmit a RRC CONTENTION RESOLUTION message to the terminal. (S5) The RRC CONTENTION RESOLUTION message may include a unique identity of the terminal.

After receiving the RRC CONNECTION REQUEST message from the terminal, the base station may also transmit a CONNECTION REQUEST message to a MME (Mobility Management Entity) for a connection between the base station and MME. (S6) The MME may transmit a CONNECTION SETUP message to the base station in response to the received CONNECTION REQUEST message. (S7) The base station may transmit RRC CONNECTION SETUP message to the terminal after receiving the CONNECTION SETUP message from the MME. (S8) After receiving the RRC CONNECTION SETUP message by the terminal, the terminal may transmit a RRC CONNECTION COMPLETE message to the base station in order to notify that the RRC connection has been complete. (S9)

When a bit number(s) (or any other parameters that represent radio resource(s)) for an allocated radio resource that received through the Message 2 is less or smaller than a bit number(s) of necessary or needed information to generate the RRC CONNECTION REQUEST message (Message 3), the terminal may generate a RRC CONNECTION REQUEST message including only a portion of the necessary or needed information, then may transmit it to the base station. Here, rest portion of the necessary or needed information may be generated later, then may transmit to the base station separately.

Figure 7:
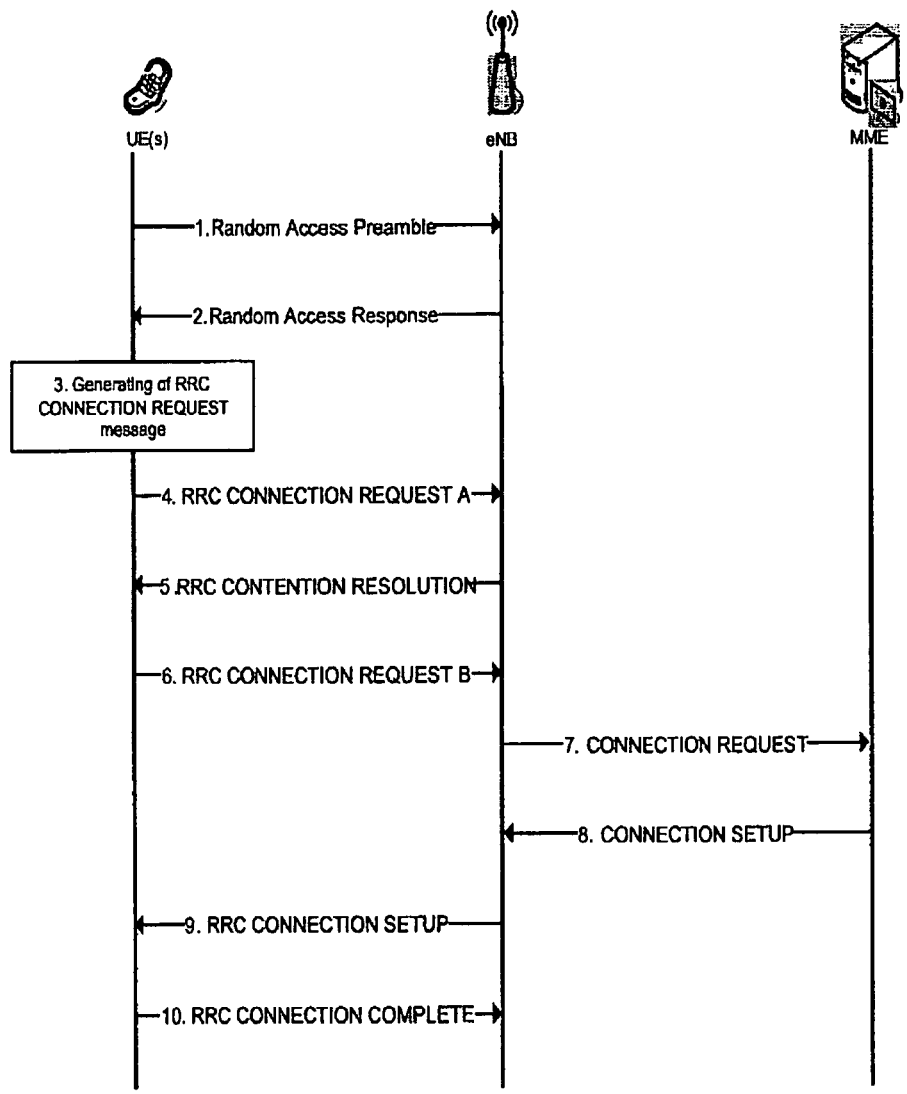
FIG. 7 shows an exemplary RRC connection procedure when not enough radio resource(s) are provided or allocated by the eNB.

FIG. 7 shows another exemplary RRC connection procedure according to the present disclosure when not enough radio resource(s) are provided or allocated by the eNB.

With reference to FIG. 7, a terminal (UE) may transmit a random access preamble for a RRC connection with a base station (eNB). (S1) The base station may transmit a random access response to the terminal in response to the received random access preamble. (S2) Here, the random access response may include uplink radio resource(s) allocated information for transmitting a RRC CONNECTION REQUEST message by the terminal.

After receiving the random access response, the terminal may check the uplink radio resource(s) included in the random access response, then may calculate or determine a necessary or needed bit number(s) for transmitting the RRC CONNECTION REQUEST message. In other words, after calculating or determining an amount of allocated radio resource(s) from the base station with a number of bit(s) which needed to be transmitted, if necessary information for transmitting the RRC CONNECTION REQUEST message can not be possibly transmitted through the allocated radio resource(s), the terminal may generate the RRC CONNECTION REQUEST message including only a portion or part of the necessary information. (S3) For example, the RRC CONNECTION REQUEST A message may only include necessary information for a connection between the terminal and base station. (i.e., necessary information for a connection (i.e., S1 connection) between the base station and MME (Mobility Management Entity) may be not included) Thus, the necessary information for the connection between the base station and MME (Mobility Management Entity) may be generated or included in a RRC CONNECTION REQUEST B message, and then may transmit later. In such situation, the base station may notify to the terminal via a RRC signal that which information should be included in the RRC CONNECTION REQUEST A message and/or which information should be included in the RRC CONNECTION REQUEST A message. Here, the RRC signal may be system information or a paging message.

For more detailed description, another example may be illustrated as follows. If it is assumed that information A, B and C should be included in a RRC CONNECTION REQUEST message and a radio resource R(1) is allocated to a terminal, such terminal may generate and transmit a RRC CONNECTION REQUEST A using only with the information A, then may generate and transmit a RRC CONNECTION REQUEST B using with the information B and C. In this case, the RRC CONNECTION REQUEST A may also include any necessary information for transmitting of RRC CONNECTION REQUEST B. For example, RRC CONNECTION REQUEST A may contain information for generating the RRC CONNECTION REQUEST B such as, a necessary bit number(s), an amount of buffer, or an amount of radio resource(s).

After the generation of the RRC CONNECTION REQUEST A and B message, the terminal may first transmit the RRC CONNECTION REQUEST A message to the base station. (S4) In this case, the terminal may include a certain identity for determining what type of information is included in the RRC CONNECTION REQUEST A. For example, when information A, B, and C should be included in a RRC CONNECTION REQUEST message (Message 3) and one bit identity is being used, the base station may determine that the information A and B were included in the RRC CONNECTION REQUEST A, if the identity is set as "0", or the base station may determine that the information c was included only in the RRC CONNECTION REQUEST A, if the identity is set as "1".

In order to provide quick resolution for a collision between the different terminals that having same preamble (signature) simultaneously, the base station may transmit a RRC CONTENTION RESOLUTION message to the terminal. (S5) The RRC CONTENTION RESOLUTION message may include a unique identity of the terminal. Also, The RRC CONTENTION RESOLUTION message may include radio resource(s) information [i.e. time, frequency, transmission format of the radio resource(s)] for transmitting a RRC CONNECTION REQUEST B message. Also, it may be possible that the base station transmits allocated information for transmitting the RRC CONNECTION REQUEST B message via a L1/L2 control channel.

The terminal may transmit the RRC CONNECTION REQUEST B message to the base station using radio resource(s) allocation information obtained from the RRC CONTENTION RESOLUTION message, System Information, or L1/L2 control channel. (S6) Here, the order of steps S5 and S6 may be reversed. Namely, the terminal may transmit the RRC CONNECTION REQUEST B message before receiving the RRC CONTENTION RESOLUTION message.

After receiving the RRC CONNECTION REQUEST A, B message from the terminal, the base station may also transmit a CONNECTION REQUEST message to a MME (Mobility Management Entity) for a connection between the base station and MME. (S7) The MME may transmit a CONNECTION SETUP message to the base station in response to the received CONNECTION REQUEST message. (S8) The base station may transmit RRC CONNECTION SETUP message to the terminal after receiving the CONNECTION SETUP message from the MME. (S9) After receiving the RRC CONNECTION SETUP message by the terminal, the terminal may transmit a RRC CONNECTION COMPLETE message to the base station in order to notify that the RRC connection has been complete. (S10)

It can be said that the present disclosure provides a method of communicating data in a wireless communications system, the method comprising: transmitting a random access preamble; receiving a random access response in response to the random access preamble, wherein the random access response includes information related to at least one allocated radio resource which will be used for transmitting a next scheduled data; determining at least one required radio resource for transmitting the next scheduled data; generating the next scheduled data by considering at least one among the at least one allocated radio resource and the determined at least one required radio resource, and transmitting the next scheduled data using the at least one allocated radio resource when the at least one allocated radio resource is equal or greater than the determined at least one required radio resource, wherein the next scheduled data is a RRC CONNECTION REQUEST message or an initial uplink grant, the next scheduled data includes a NonAccess Stratum (NAS) message, the NAS message is at least one of Attach Request, Routing Area Update Request, Detach Request, and Service Request, the generating the next scheduled data comprises comparing the determined at least one required radio resource with the at least one allocated radio resource, the generating the next scheduled data further comprises separating the next scheduled data into two or more data groups when the at least one allocated radio resource is below or smaller than the determined at least one required radio resource, transmitting each data group separately, the next scheduled data of a first data group is related to information for a connection between a terminal and a base station, and the next scheduled data of a second data group is related to information for a connection between the base station and a Mobility Management Entity (MME), a Radio Resource Control (RRC) signal from a base station to a terminal designates what information of the next scheduled data should be included in which data group, the information related to what information of the next scheduled data should be included in which data group is determined by an amount of data which will be transmitted from the terminal and/or an amount of allocated radio resource in the random access response, the RRC signal is either system information or a paging message, each separated data group includes an identity for indicating a type of information, the determined at least one allocated or the at least one required radio resource is defined by one or more bit numbers or any parameters that represent radio resources, the generating the next scheduled data comprises checking the determined at least one required radio resource with a threshold value, and the generating the next scheduled data further comprises comparing the determined at least one required radio resource with the at least one allocated radio resource when the determined at least one required radio resource is below or smaller the threshold value.

The present disclosure also may provide a method of communicating data in a wireless communications system, the method comprising: receiving a random access preamble; transmitting a random access response in response to the received the random access preamble, wherein the random access response includes information related to at least one allocated radio resource for transmitting a next scheduled data by a terminal; and receiving the next scheduled data from the terminal, wherein the terminal determines at least one required radio resource for transmitting the next scheduled data, the next scheduled data is generated by considering at least one among the at least one allocated radio resource and the determined at least one required radio resource by the terminal before transmitting the next scheduled data, the next scheduled data is a RRC CONNECTION REQUEST message, determining whether the next scheduled data contains any NAS message by checking an identity included in the next scheduled data, the identity is used for indicating information of which group is included in the next scheduled data, the determined at least one required radio resource is compared with the at least one allocated radio resource for generating the next scheduled data by the terminal, the next scheduled data is separated into two or more data groups when the at least one allocated radio resource is below or smaller than the determined at least one required radio resource, and each data group is separately received, the next scheduled data of a first data group is related to information for a connection between the terminal and a base station, and the next scheduled data of a second data group is related to information for a connection between the base station and a Mobility Management Entity (MME), transmitting a Radio Resource Control (RRC) signal in order to designate what information of the next scheduled data should be included in which data group, the RRC signal is either system information or a paging message, each separated data group includes an identity for indicating a type of information, the determined at least one required radio resource is compared with a threshold value, and the determined at least one required radio resource is compared with the at least one allocated radio resource for generating the next scheduled data by the terminal if the determined at least one required radio resource is below or smaller the threshold value, the determined at least one allocated or the at least one required radio resource is defined by one or more bit numbers or any parameters that represent radio resources.

It can be also said that the present disclosure provides a mobile terminal for communicating data in a wireless communications system, the mobile terminal comprising: a transceiver adapted to transmit or receive the data; a memory adapted to store the data transmitted or received via the transceiver or from an external source; and a processor cooperating with the transceiver and the memory and adapted to perform the steps of, transmitting a random access preamble; receiving a random access response in response to the random access preamble, wherein the random access response includes information related to at least one allocated radio resource which will be used for transmitting a next scheduled data; determining at least one required radio resource for transmitting the next scheduled data; and generating the next scheduled data by considering at least one among the at least one allocated radio resource and the determined at least one required radio resource.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of communicating data in a wireless communications system, the method comprising:
    transmitting a random access preamble via a terminal;
    receiving a random access response, via the terminal, in response to the random access preamble, the random access response including information related to at least one allocated radio resource that will be used for transmitting a next scheduled data, the next scheduled data being an RRC CONNECTION REQUEST message;
    determining, via the mobile terminal, at least one required radio resource for transmitting the next scheduled data;
    comparing, via the terminal, the determined at least one required radio resource with a threshold value;
    comparing, via the terminal, the determined at least one required radio resource with the at least one allocated radio resource only when the determined at least one required radio resource is larger than the threshold value;
    generating the next scheduled data, via the terminal, by considering the at least one allocated radio resource and the determined at least one required radio resource, the next scheduled data being separately generated into two or more data groups when the at least one allocated radio resource is smaller than the determined at least one required radio resource; and
    transmitting the next scheduled data to a network via the terminal, the next scheduled data including a specific identity for indicating a type of data included in the next scheduled data, and the specific identity being used only when the next scheduled data is separately generated into the two or more data groups and transmitted.

2. The method of claim 1, wherein the next scheduled data includes a NonAccess Stratum (NAS) message.

3. The method of claim 2, wherein the NAS message is an Attach Request, a Routing Area Update Request, a Detach Request, or a Service Request.

4. The method of claim 1 wherein transmitting the next scheduled data comprises using the at least one allocated radio resource when the at least one allocated radio resource is equal to or greater than the determined at least one required radio resource.

5. The method of claim 1, wherein transmitting the next scheduled data comprises transmitting each of the two or more data groups separately.

6. The method of claim 1, wherein the next scheduled data of a first data group of the two or more data groups is related to information for a connection between the terminal and a base station, and the next scheduled data of a second data group of the two or more data groups is related to information for a connection between the base station and a Mobility Management Entity (MME).

7. The method of claim 1, wherein a Radio Resource Control (RRC) signal from a base station to the terminal designates what information of the next scheduled data should be included in which data group of the two or more data groups.

8. The method of claim 1, wherein each data group of the two or more data groups includes an identity for indicating a type of information.

9. The method of claim 1, wherein the generating the next scheduled data comprises checking the determined at least one required radio resource with the threshold value.

10. A mobile terminal for communicating data in a wireless communications system, the mobile terminal comprising:
    a transceiver configured to transmit or receive the data;
    a memory configured to store the data transmitted or received via the transceiver or from an external source; and
    a processor configured to cooperate with the transceiver and the memory and to:
        transmit a random access preamble;
        receive a random access response in response to the random access preamble, wherein the random access response includes information related to at least one allocated radio resource which will be used for transmitting a next scheduled data, the next scheduled data being an RRC CONNECTION REQUEST message;
        determine at least one required radio resource for transmitting the next scheduled data;
        compare the determined at least one required radio resource with a threshold value;
        compare the determined at least one required radio resource with the at least one allocated radio resource only when the determined at least one required radio resource is larger than the threshold value;
        generate the next scheduled data by considering the at least one allocated radio resource and the determined at least one required radio resource, the next scheduled data being separately generated into two or more data groups when the at least one allocated radio resource is smaller than the determined at least one required radio resource; and
        control transmitting of the next scheduled data to a network, the next scheduled data including a specific identity for indicating a type of data included in the next scheduled data, and the specific identity being used only when the next scheduled data is separately generated into the two or more data groups and transmitted.

* * * * *